July 26, 1938. E. G. SIMPSON ET AL 2,124,755
SEAT ADJUSTER
Filed May 27, 1936  4 Sheets-Sheet 3

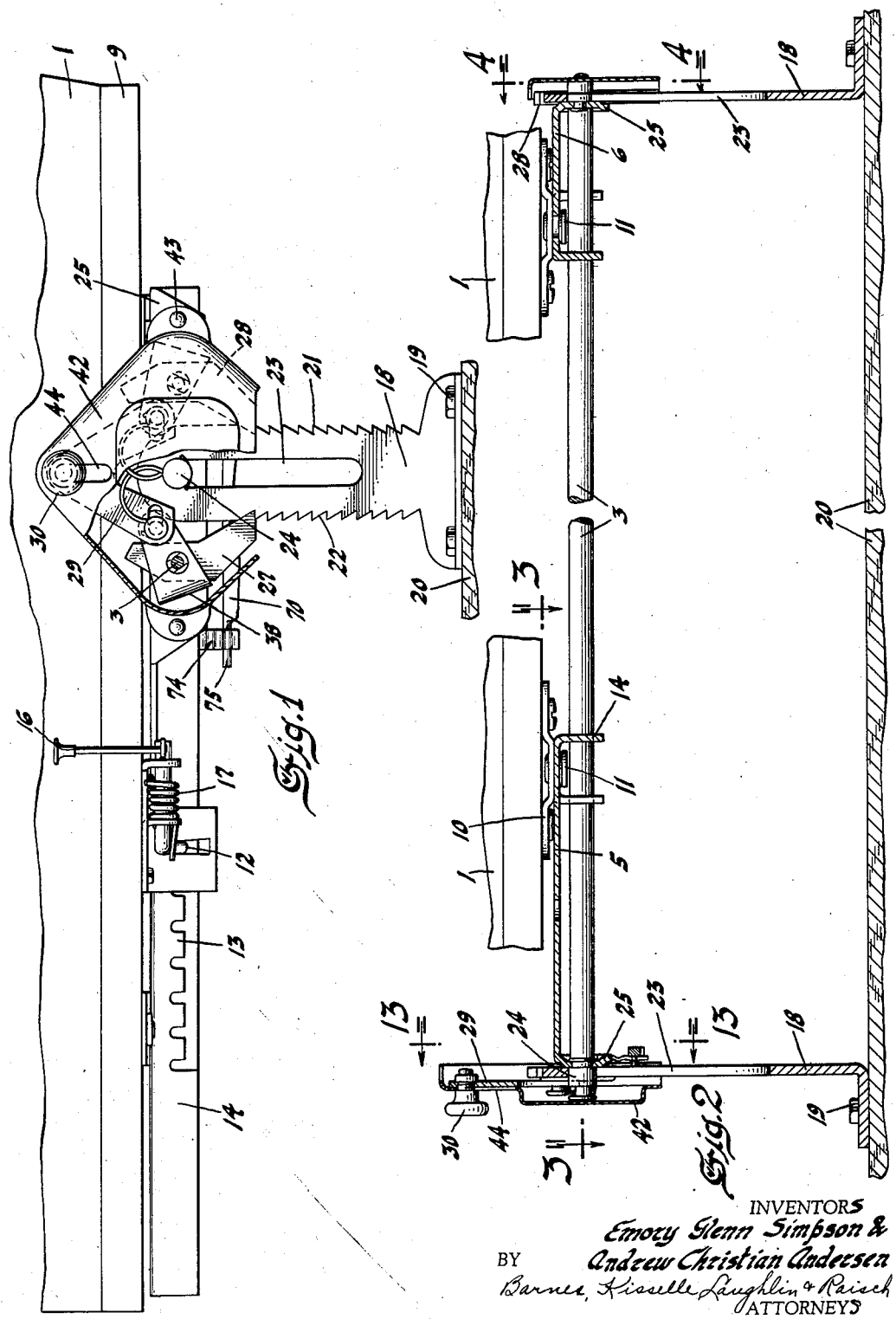

INVENTORS
Emory Glenn Simpson &
Andrew Christian Andersen
BY Barnes, Kisselle, Laughlin & Raisch
ATTORNEYS Patented July 26, 1938

2,124,755

UNITED STATES PATENT OFFICE 2,124,755

SEAT ADJUSTER

Emory Glenn Simpson and Andrew Christian Andersen, Detroit, Mich., assignors to Ternstedt Manufacturing Company, Detroit, Mich., a corporation of Michigan Application May 27, 1936, Serial No. 82,055

14 Claims. (Cl. 155—88)

This invention relates to a seat adjuster and more particularly to a seat that can be raised or lowered within a predetermined range to suit the individual desire of the occupant.

It is an object of this invention to produce a vertically adjustable seat which is readily adjustable both when occupied and unoccupied.

More particularly the invention contemplates a vertically adjustable seat in which the seat or a portion thereof functions as, and is, one of the elements of the adjusting mechanism.

More particularly the invention contemplates a vertically adjustable seat in which the energy supplied by the occupant or other operator of the seat is transmitted by movement of the entire seat or a portion thereof, such as the seat bottom or the seat back, to other mechanism which raises or lowers the seat.

In the drawings:

Fig. 1 is a fragmentary side elevation of the seat and the adjusting mechanism.

Fig. 2 is a transverse vertical section through the seat and adjuster.

Figure 3:
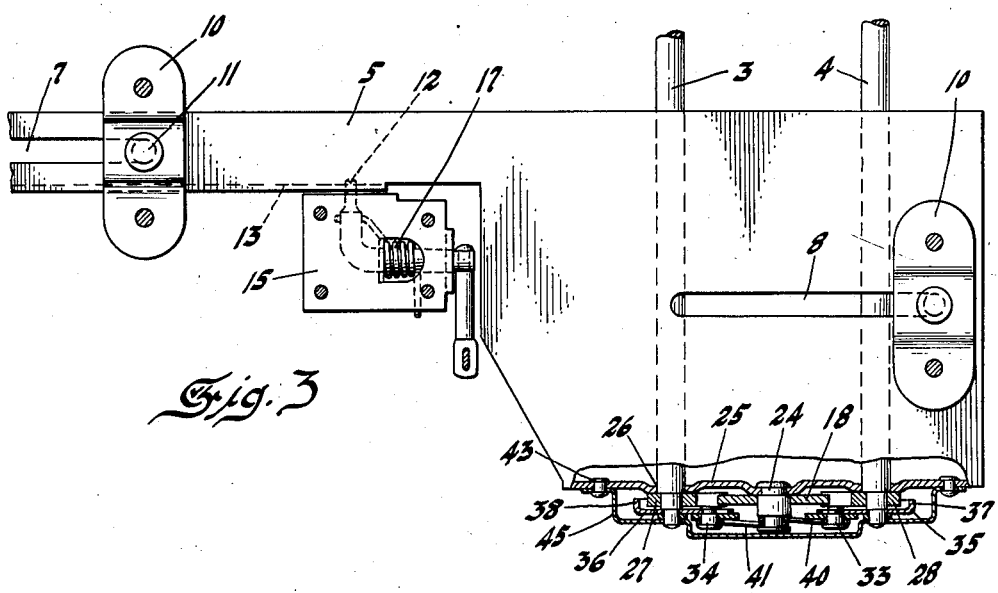
Fig. 3 is a section along the line 3—3 of Fig. 2.
Figure 4:
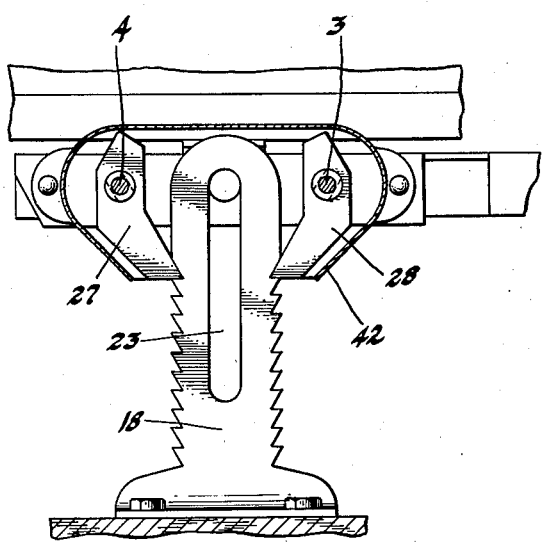
Fig. 4 is a section along the line 4—4 of Fig. 2.
Figure 5:
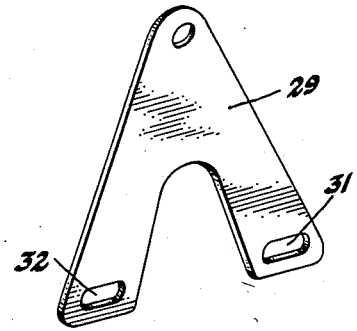
Fig. 5 is a detail of the shifter plate for controlling the raising and lowering movements of the seat.

Referring more particularly to the drawings there is shown a portion of the customary seat 1 provided with the usual bottom and back cushions.

The seat is designed to be slidably adjustable fore and aft. To this end the parallel transverse support shafts 3 and 4 have mounted thereon the support track members 5 and 6, each of which is provided with the elongated slots 7 and 8. The seat bottom frame 9 has secured thereto a plurality of brackets 10 to which are fixed the headed studs 11. These studs 11 slidably engage the support plates 5 and 6 in the slots 7 and 8 to permit forwardly and rearwardly sliding adjusting of the seat 1. The seat is held in any of its forwardly or rearwardly adjusted positions by the latch bolt 12 which interengages the rack 13 formed in the depending flange 14 of the plate 5.

The swinging bolt 12 is mounted on the plate 15 which is secured by screws to the seat frame 9. The swinging bolt 12 can be disengaged from the rack 13 by raising the handle 16. Upon release of the handle 16 the bolt is swung into engagement with the rack 13 by the torsion spring 17.

Since this invention relates to an adjustable seat which is primarily intended for adjustment by the occupant, and for use in an automotive vehicle body where space is at a premium and efficiency utilized, it is desirable, although not necessary, that the seat be raised and lowered with a step by step movement. To effect this end it is proposed in the raising and lowering of the seat to so mount the seat that the movement of the seat, or a portion thereof, in the raising and lowering will be an alternating movement, that is, the seat will first move in one direction and then in the opposite direction to effect vertical adjustment thereof. As herein shown the seat is mounted so that the particular type of alternating movement is a rocking movement.

A pair of L-shaped posts 18 are secured to the floor 20 by the bolts 19, one on each side of the seat. The front and rear vertical edges of each post 18 are provided with a plurality of teeth which form the racks 21 and 22. The posts 18 are each provided with elongated, vertically extending slots 23 which serve as guideways for the pins 24 which are riveted to the depending flanges 25 of the plates 5 and 6. The shafts 3 and 4 are journaled in the depending flanges 25 as at 26. The shaft 3 has fixed on each end thereof a pawl 27 so that the pawls 27 rotate with the shaft 3. The shaft 4 has similarly fixed on each end thereof a pawl 28.

The engagement of the pawls with the racks preferably is controlled from one side of the seat. This control mechanism is herein shown on the right side of the seat and comprises a V-shaped shifter plate 29 which has affixed to the upper ends a finger piece or button 30. The legs of the shifter plate 29 are provided with slots 31 and 32 which have a lost motion connection with pins 33 and 34 fixed to the levers 35 and 36. The lever 35 is freely rotatably mounted on the end of the shaft 4 and the lever 36 is freely rotatably mounted on the end of the rod 3. The lever 35 is provided with the flange 37 which overlaps the pawl 28 and the lever 36 is provided with the flange 38 which overlaps the pawl 27. The pins 33 and 34 have a lost motion connection with the plate 29 in the slots 31 and 32. An expansion spring 40 has one end secured to the pin 33 and the other end secured to the pin 24. A similar expansion spring 41 has one end secured to the pin 34 and the other end secured to the pin 24. The pawls and the ends of the shafts 3 and 4 are preferably concealed by cover plates 42 which are secured by rivets 43 to the depending flanges 25 of the plates 5 and 6. The right hand cover plate is provided with a slot 44 to permit vertical travel of the button 30. The cover plates 42 are provided with the inwardly turned flanges 45. The lower ends 46 of these flanges serve as stops against which the pawls 27 and 28 abut when the mechanism is set for lowering.

The operation of the seat is as follows: The seat is shown in fully raised position in Figs. 1 and 6. When it is desired to lower the seat the button 30 is pushed downwardly toward the bottom of the slot 44. This causes downward travel of the plate 29. The downward travel of the plate 29, acting through the pins 33 and 34, swings the lever 35 counter-clockwise and the lever 36 clockwise so that the flanges 37 and 38 engage the pawls 28 and 29 and swing them about their pivots, namely, the ends of the shafts 3 and 4. Thus, the force of the spring 40 tends to rotate the pawl 28 counter-clockwise and the spring 41, acting through the lever 36, tends to rotate the pawl 27 clockwise.

Figure 6:
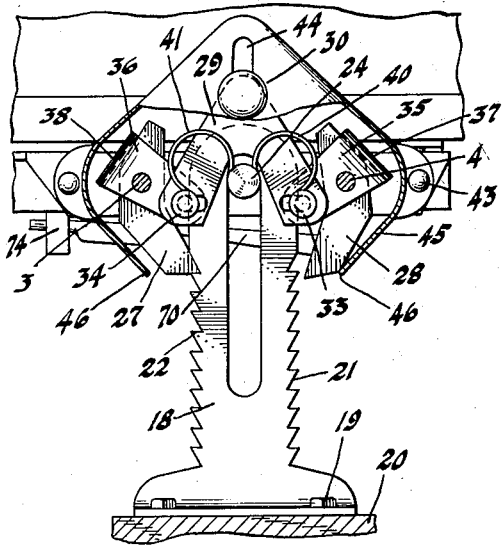
Figs. 6, 7 and 8 show the seat being lowered and the position of the adjusting parts to effect lowering of the seat.
Figure 7:
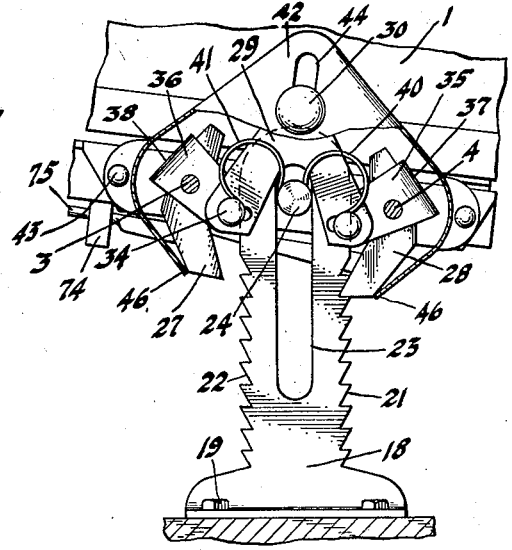
Figure 8:
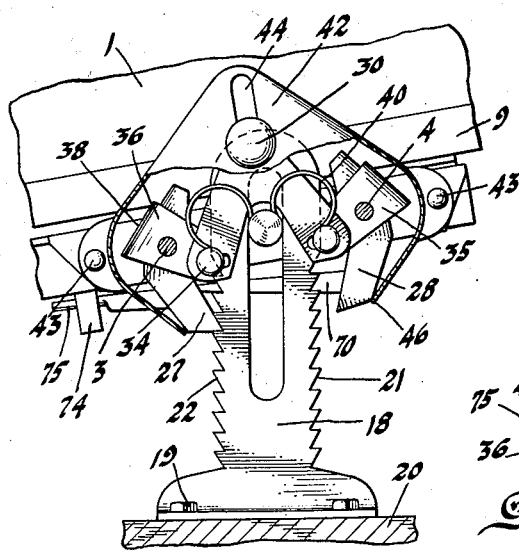

As shown in Fig. 6, the pawl 27 is interengaged with rack 22 whereas pawl 28 has been rotated counter-clockwise and abuts the stop 46. Since the pawls 27 and 28 are fixed on the shafts 3 and 4 the position of the pawls at the other end of the shaft is the same. Hence, at this time the seat, as shown in Fig. 6, is supported by the two rearmost pawls 27 and shaft 3. If the seat is now rocked clockwise about shaft 3, as viewed in Figs. 1 and 6, so that the portion of the seat forward of the shaft 3 swings downwardly and the portion of the seat rearward of the shaft 3 swings upwardly, the pawl 28 will swing inwardly into engagement with the rack 21, as shown in Fig. 7. As soon as the weight of the seat is transferred to the pawls 28 and shaft 4, the pawls 27 are free to be swung by spring 41 out of engagement with the rack 22 into engagement with the stop 46, as shown in Fig. 7.

If the seat, as viewed in Fig. 7, is now rocked counter-clockwise about shaft 4, the seat will be lowered and the pawl 27 will again engage the rack 2 below the position shown in Fig. 6. Preferably the pawls 27 and 28 in their up and down travel engage every other tooth of the racks 21 and 22. However, the length of the step taken by the pawls can be varied.

Figure 9:
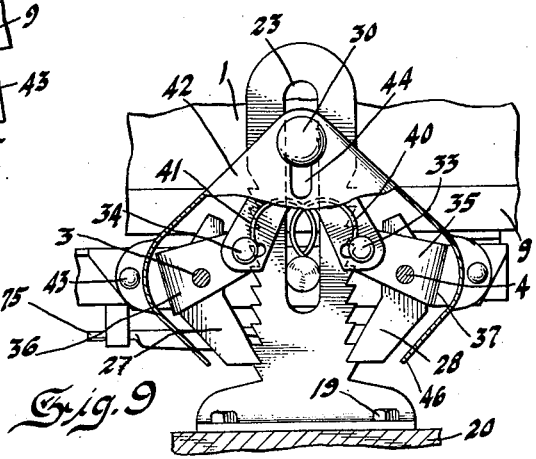
Figs. 9, 10, 11 and 12 show the seat being raised and the relative positions of the parts of the adjuster to effect raising of the seat.
Figure 10:
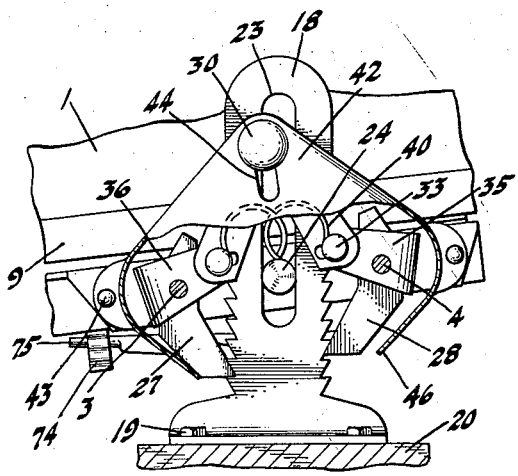
Figure 11:
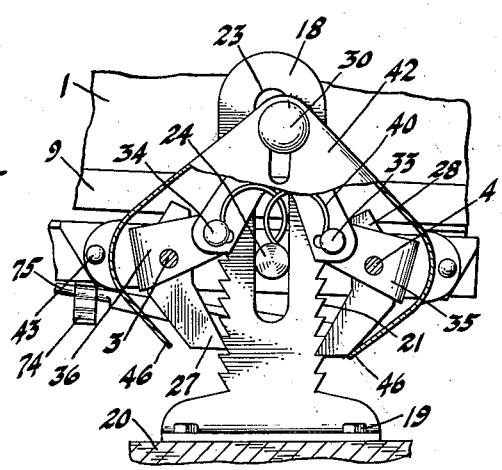
Figure 12:
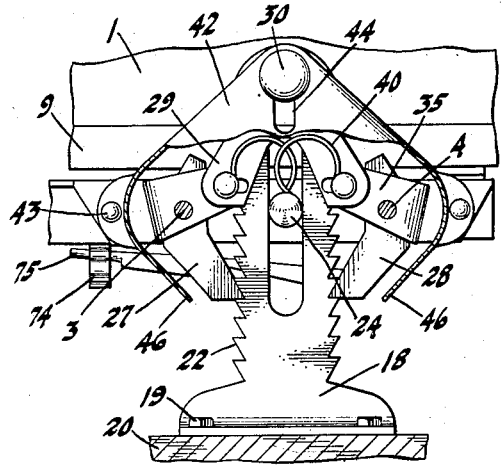

As shown in Fig. 9, the seat is in completely lowered position. To raise the seat from this position the button 30 and shifter plate 29 are raised to the position shown in Fig. 9. At this time the button 30 is adjacent the top of the slot 44 and the springs 40 and 41 have been shifted upwardly so that the pins 33 and 34 are now above center. Therefore, the springs 40 and 41, acting through pins 33 and 34 and levers 35 and 36, tend to urge the portion of the pawls 27 and 28 below the shafts 3 and 4 into interengagement with the racks 21 and 22. If the seat is now rocked counter-clockwise, as viewed in Fig. 9, about shaft 3, pawl 28 will travel along rack 21 to the position shown in Fig. 10. If the direction of the rocking movement of the seat is now reversed so that the seat swings clockwise about the shaft 4, as viewed in Fig. 10, the pawl 27 will travel upwardly along the rack 22 a distance of one or more teeth. Continuation of this rocking movement of the seat will thus elevate the seat along the supports 18.

Both in the raising and lowering of the seat as the seat is rocked about the shafts 3 and 4 the pins 24 slidably engage the supports 18 in the slots 23 to guide the vertical travel of the seat.

Figure 13:
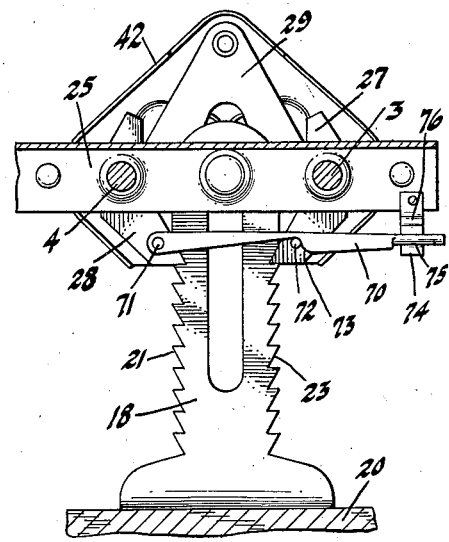
Fig. 13 is a section along the line 13—13 of Fig. 2.

As shown in Fig. 13, after the seat has been raised or lowered to any desired position within its range of adjustment it can be locked in horizontal position by means of a latch 70 pivoted to pawl 27 as at 71. Pawl 28 carries a pin 72. Latch 70 has a step 73 which engages behind the pin 72 and locks both pawls 28 into interengagement with the racks 21 and 22 on post 18. The latch 70 is held in latched relation by a spring keeper 74 which yieldably engages the end of the latch 70 in depression 75 to hold the latch in latching relation with pin 72. When the latch is shifted upwardly about its pivot 71 it yieldably engages the depression 76 in the spring keeper 74 to hold the latch retracted.

We claim:

1. In an automotive vehicle, a seat, a vertically adjustable support for the seat, means for interconnecting the seat and the vertically adjustable support to permit alternating movement of the seat or a portion thereof, motion translating and transmitting means for translating the alternating motion of the seat into vertical motion and transmitting the said vertical motion to said adjustable support whereby alternating movement of the said seat or a portion thereof adjusts the said support and thereby vertically adjusts the seat.

2. In combination, a seat, a vertically adjustable support for the said seat, operative connections between the seat and the adjustable support permitting alternating movement of the seat on the said support, and motion translating and transmitting mechanism operated by the alternating movement of the said seat or a portion thereof for translating the alternating motion of the seat into vertical motion and transmitting the said vertical motion to said adjustable support to vertically adjust the said support and the seat carried thereby.

3. In combination, a seat, a vertically adjustable support for the said seat, operative connections between the seat and the adjustable support permitting alternating movement of the seat on the said support, motion translating and transmitting mechanism operated by the alternating movement of the said seat for translating the alternating motion of the seat into vertical motion and transmitting the said vertical motion to said adjustable support to vertically adjust the said support and the seat carried thereby, and a shiftable control for said mechanism shiftable into one positon whereby alternating movement of the seat vertically adjusts the said support and raises the seat and shiftable to another position whereby alternating movement of the seat on its support vertically adjusts the support and lowers the seat.

4. In combination, a seat comprising back and bottom members, a vertically adjustable support for the said seat, operative connections between the seat and the adjustable support permitting alternating movement of the seat on the said support, motion translating and transmitting mechanism operated by the alternating movement of one of the said seat members for translating the alternating motion of the seat into vertical motion and transmitting the said vertical motion to said adjustable support to vertically adjust the said support and the seat carried thereby, a shiftable control for said mechanism shiftable into one position whereby alternating movement of the said seat member vertically adjusts the said support and raises the seat and shiftable to another position whereby alternating movement of the seat on its support vertically adjusts the support and lowers the seat, and a lock for latching the seat in any of its vertically adjusted positions.

5. In combination with a seat, an extensible support therefor, connections between the seat and the said extensible support permitting alternating movement of the said seat or a portion thereof, elevating mechanism operatable step by step including operative connections with the said seat whereby alternating movement of the seat is transmitted by the said connections to the said elevating mechanism to vertically adjust the extensible support step by step and thereby vertically adjust the seat.

6. In combination with a seat comprising back and bottom members, an extensible support therefor, connections between the seat and the said extensible support permitting alternating movement of one of the said seat members, elevating mechanism operatable step by step including operative connections with the said seat member whereby alternating movement of the seat member is transmitted by the said connections to the said elevating mechanism to vertically adjust the extensible support step by step and thereby vertically adjust the seat, and a shiftable control for the said elevating mechanism for shifting the elevating mechanism into position whereby alternating movement of the seat member vertically elevates the support step by step to raise the seat and shiftable into another position whereby alternating movement of the seat member collapses the elevating mechanism step by step to lower the seat.

7. In an automotive vehicle, a seat adapted to face in a predetermined direction in the said vehicle, vertically adjustable mechanism adapted to support the said seat on the floor of the vehicle, operative connections between the said seat and its support permitting alternating movement of the said seat on the said support and motion translating means for translating the alternating movement of the seat into vertical motion and transmitting said vertical motion to the vertical adjustable support mechanism whereby alternating movement of the said seat upon its said support while the seat faces the same predeterbined position vertically adjusts the said seat.

8. In combination, a seat, a support therefor, operative connections between the support and the said seat permitting said seat to rock upon the said support and to move upwardly and downwardly along the said support, pawl and ratchet mechanism carried by the seat and the said support actuatable by the rocking movement of the said seat to adjust the said seat vertically along the said support.

9. In combination, a seat, a support therefor, operative connections between the support and the said seat permitting said seat to rock upon the said support and to move upwardly and downwardly along the said support, pawl and ratchet mechanism carried by the seat and the said support actuatable by the rocking movement of the said seat to adjust the said seat vertically along the said support, and a shiftable control for the said pawl and ratchet mechanism shiftable into one position whereby rocking movement of the seat causes the pawl and ratchet mechanism to raise the seat and shiftable into another position whereby rocking movement of the seat causes the pawl and ratchet mechanism to lower the seat upon its support.

10. In combination, a seat, a support therefor, operative connections between the support and the said seat permitting said seat to rock upon the said support and to move upwardly and downwardly along the said support, pawl and ratchet mechanism carried by the seat and the said support actuatable by the rocking movement of the said seat to adjust the said seat vertically along the said support, a shiftable control for the said pawl and ratchet mechanism shiftable into one position whereby rocking movement of the seat causes the pawl and ratchet mechanism to raise the seat and shiftable into another position whereby rocking movement of the seat causes the pawl and ratchet mechanism to lower the seat upon its support, and a latch for latching the pawl and ratchet mechanism in any of its vertically adjusted positions to hold the seat against rocking movement.

11. In combination with a seat, a support, operative connections between the support and the said seat connecting the seat for rocking about the said support and to move upwardly and downwardly along the said support, a pair of racks, a pawl for interengagement with each of said racks, said racks and pawls being carried by the said seat and support and actuated in the rocking movement of the said seat or a portion thereof whereby the pawls travel along the said racks to vertically adjust the seat.

12. In combination with a seat, a support, operative connections between the support and the said seat connecting the seat for rocking about the said support and to move upwardly and downwardly along the said support, a pair of racks, a pawl for interengagement with each of said racks, said racks and pawls being carried by the said seat and support and actuated in the rocking movement of the said seat or a portion thereof whereby the pawls travel along the said racks, and a shiftable control including over-center springs shiftable into one position for throwing both of said pawls into yieldable engagement with the said rack whereby rocking movement of the seat or a portion thereof causes the pawls to alternately support the seat and to travel along the said racks to vertically adjust the said seat along its support.

13. In combination with a seat, a support, operative connections between the support and the said seat connecting the seat for rocking about the said support and to move upwardly and downwardly along the said support, a pair of racks, a pawl for interengagement with each of said racks, said racks and pawls being carried by the said seat and support and actuated in the rocking movement of the said seat or a portion thereof whereby the pawls travel along the said racks, a shiftable control including over-center springs shiftable into one position to yieldably urge both of said pawls away from their respective racks, and a stop for each of said pawls to limit movement thereof away from its respective rack whereby when the seat is raised and the shiftable control is shifted into one position one of the said pawls interengages with its rack to permit said seat to rock about this pawl until the other pawl is swung into interengagement with its rack to effect step by step lowering of the said seat.

14. In combination with a seat, a support, operative connections between the support and the said seat connecting the seat for rocking about the said support and to move upwardly and downwardly along the said support, a pair of racks, a pawl for interengagement with each of said racks actuated in the rocking movement of the said seat or a portion thereof to travel along the said racks, a shiftable control including over-center springs shiftable into one position to yieldably urge both of said pawls away from their respective racks and into engagement with said stops, a stop for each of said pawls to limit movement thereof away from its respective rack whereby when the seat is raised and the shiftable control is shifted into one position one of the said pawls interengages with its rack to permit said seat to rock about this pawl until the other pawl is swung into interengagement with its rack to effect step by step lowering of the said seat, and a latch for latching both the said pawls in engagement with their respective racks to lock the seat against further lowering.

EMORY GLENN SIMPSON.
ANDREW CHRISTIAN ANDERSEN.